(12) United States Patent
De Almeida

(10) Patent No.: US 6,434,825 B1
(45) Date of Patent: Aug. 20, 2002

(54) METHOD OF DIMINISHING THE CROSS SECTION OF AN OPENING OF A HOLLOW DEVICE LOCATED IN A FLOW PIPE

(75) Inventor: Alcino Resende De Almeida, Rio de Janeiro (BR)

(73) Assignee: Petroleo Brasileiro S.A. - Petrobras (BR)

( * ) Notice: Subject to any disclaimer, the term of this patent is extended or adjusted under 35 U.S.C. 154(b) by 0 days.

(21) Appl. No.: 09/904,500

(22) Filed: Jul. 16, 2001

(30) Foreign Application Priority Data

Feb. 7, 2001 (GB) ............................................. 0103055

(51) Int. Cl.⁷ .............................................. B21D 51/16
(52) U.S. Cl. .............................. 29/890.12; 29/890.124; 29/402.09; 138/98
(58) Field of Search ....................... 29/890.121, 890.12, 29/890.124, 402.09, 423; 138/98, 97

(56) References Cited

U.S. PATENT DOCUMENTS 3,659,305 A  *  5/1972  Powers
4,663,795 A  *  5/1987  Neff
6,062,264 A  *  5/2000  Dickson
6,102,624 A  *  8/2000  Delaforce

FOREIGN PATENT DOCUMENTS

GB          2 341 695           3/2000

OTHER PUBLICATIONS

U.S. Application No. 09/878,275 filed Jun. 12, 2001.

* cited by examiner

*Primary Examiner*—S. Thomas Hughes
*Assistant Examiner*—T. Nguyen
(74) *Attorney, Agent, or Firm*—Nixon & Vanderhye PC

(57) ABSTRACT

A method of diminishing the size of the cross section of an opening of a first hollow device located in an undersea flow pipe through which passes a fluid flow uses a second hollow device to be inserted into the undersea flow pipe, the second hollow device being provided with a leading portion and a trailing portion, the leading portion being of a smaller external diameter than the trailing portion, the second hollow device being provided with a passage extending longitudinally therethrough. Next a foam pig is inserted immediately after the second hollow device. Urged by the fluid flow, the foam pig displaces the second hollow device along said undersea flow pipe, until the second hollow device encounters the first hollow device. The leading portion of the second hollow device is then inserted into an opening of the first device, thereby diminishing the size of a cross section of the opening.

8 Claims, 3 Drawing Sheets

METHOD OF DIMINISHING THE CROSS SECTION OF AN OPENING OF A HOLLOW DEVICE LOCATED IN A FLOW PIPE

FIELD OF THE INVENTION

The present invention relates to a method of diminishing the cross section of an opening of a hollow device located in a flow pipe using flexible pigs to engage a second hollow device with a first hollow device which has been previously set into the flow pipe, thereby achieving a reduction in the cross section of the opening through which pass the fluids flowing through the flow pipe. The proposed method is particularly suited to be used in an undersea pipe flow.

STATE OF THE ART

Pipes are widely used in the industry to transport diverse kinds of fluids. Such fluids may comprise a single constituent or multiple constituents, they may comprise a single phase or multiple phases, and they may be highly compressible or they may be almost not compressible. Such pipes may be provided with varying internal diameters and configurations. In the oil industry the pipes, or flow pipes, as they are usually referred to, are used to promote the flow of fluids from oil producing wells to gathering centers, where the fluids are processed.

When an undersea oil field is commercially exploited, it is necessary for the production from the oil producing wells to flow through pipes to a production unit located at the surface. An undersea flow pipe in usually connected at one end to an oil producing well and lies down on the sea bed but is connected at its other end to an undersea flow riser, which carries the fluids to the production unit at the surface.

Situations may occur in which it is necessary to insert a hollow device into the undersea flow pipe, in a certain location. Such device can for example be a body, externally shaped to match the inside of a portion of the undersea flow pipe where it is to be located with an orifice of any shape extending longitudinally therethrough so as to provoke a constriction in the flow.

The object of the insertion of such device into the undersea flow pipe may be, for example, to introduce a constriction in the flow to control the features of this flow, or to introduce an element intended to be used in flow rate measuring operations. In the oil industry situations occur in which there is the need to control the phenomenon known as severe slugging, which may occur in production systems provided with descending flow pipes followed by flow risers.

The severe slugging phenomenon is characterized by intense oscillations in the pressure and flow rate levels occurring in a multiphase flow having a gaseous phase. The severe slugging phenomenon causes disturbances to the undersea production activities, which can seriously impair or even shut the oil production down.

GB 2 341 695, commonly owned by the applicants of the present patent application, discloses a device used to control the severe slugging phenomenon. A hollow device, preferably a venturi, is installed into a descending undersea flow pipe relatively close to the junction to a flow riser.

The design of new undersea flow pipe may anticipate the need of such hollow device, which can be installed during the deployment of the undersea flow pipe. In existing undersea flow pipes where access to the interior of the undersea flow pipe is easy and the oil production flow can be interrupted, the hollow device can be installed after cutting the undersea flow pipe, the integrity of the undersea flow pipe being reinstated by using any of the known pipe assembling techniques, e.g., welding.

However, besides causing ceasing of profits, shutting down of the production can cause many operational problems, especially in undersea flow pipe under the effects of low temperatures of the sea bed. Many of these undersea flow pipes are located at great depth of sea, hindering the access of divers. A cutting operation in such undersea flow pipe would be very difficult to implement, as it involves the retrieval of the undersea flow pipe from the seabed, or carrying out the operation using a remote operated vehicle, both being extremely expensive, time consuming and complex operations.

Thus, there has been a need to provide a way to install a hollow device as described in GB 2 341 695 in undersea flow pipe without causing the above drawbacks. The present invention propose the use of polymeric foam blocks to set the hollow device in its operational position.

The British patent application 0102331.6, of Jan. 30, 2001, commonly owned by the applicants of the present patent application, discloses a method to set a hollow device into an undersea flow pipe using flexible pigs, preferably foam pigs formed from polymeric foam. The word "pig" is used here to denote devices which are inserted into a pipe and which are urged therealong by the flow in that pipe, usually to clean the interior of the pipe.

Situations may occur which, for any reason, it is necessary to diminish the size of the cross section of the passage of the opening of a hollow device already installed in an undersea flow pipe. For this, it would then be necessary to retrieve the existing first hollow device and next to set in its place a second hollow device having an opening whose cross section is smaller than the cross section of the opening of the first hollow device.

In such case it would be necessary to pass a first pig into the undersea flow pipe, to remove the first hollow device, and next to pass a second pig to set the second hollow device. These operations are expensive and time consuming, therefore increasing the costs of the operation.

The present invention proposes a novel method to diminish the size of the cross section of the opening of a hollow device through which fluids from a flow in an undersea pipe flow pass, thereby overcoming the above drawbacks.

SUMMARY OF THE INVENTION

The present invention relates to a method to diminish the cross section of the opening of a first hollow device previously set into a flow pipe, through which a fluid flow flows, the method comprising the steps of:

first inserting a second hollow device at an end of said flow pipe located upstream of a point where said first hollow device operates, said second hollow device being provided with a leading portion and a trailing portion, said leading portion being of a smaller external diameter than said trailing portion, said leading portion being able to be sealingly inserted into into said opening of said first hollow device, said trailing portion being able to be sealingly set into said flow pipe;

next inserting a driving means immediately after said second hollow device;

allowing said driving means to be urged by said flow flowing in said flow pipe, thereby allowing a displacement of said second hollow device along said flow pipe towards said first hollow device;

when said second hollow device encounters said first device, allowing said leading portion of said second hollow device to be progressively longitudinally inserted into said opening of said first hollow device, until said trailing portion of said second device contacts said first hollow device, thereby stopping said displacement of said second hollow device, whereby said leading portion of said second hollow device will be fully inserted into said opening of said first hollow device, and allowing said driving means to pass through a passage in said second hollow device, urged by a pressure exerted by said fluid flow flowing in said flow pipe, said passage being of a smaller internal diameter of said opening of said first hollow device.

BRIEF DESCRIPTION OF THE DRAWINGS

The invention will be now described in more detail together with the attached drawings which, for illustration only, accompany the present specification, wherein.

DETAILED DESCRIPTION OF THE INVENTION

Figure 1:
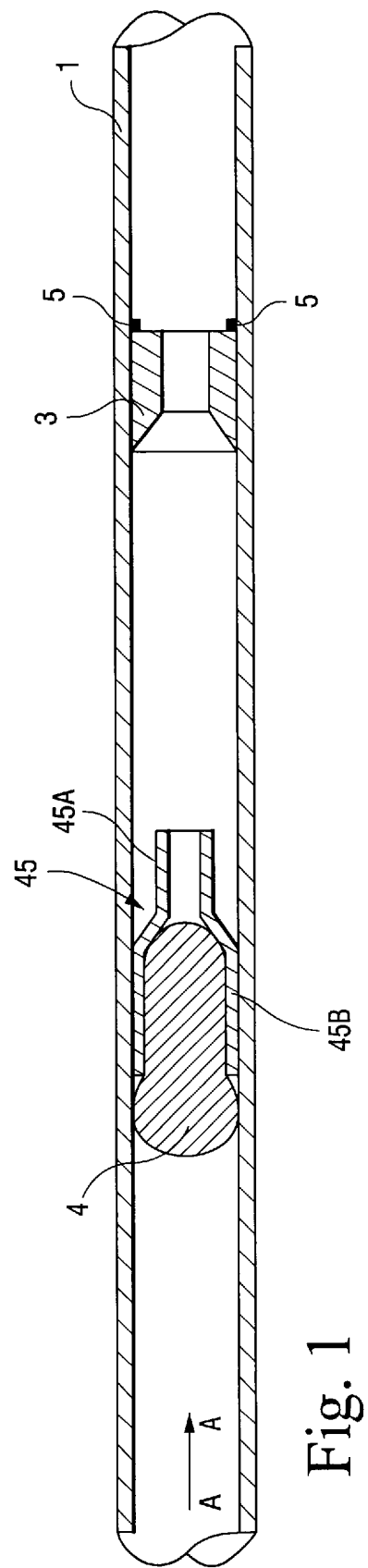
FIG. 1 is a longitudinal cross section view of an undersea flow pipe depicting a second hollow device being urged by a foam pig towards a first hollow device previously set into the undersea flow pipe.

In FIG. 1 a first hollow device 3 is located at a certain point of an undersea flow pipe 1, and kept in position by stop means 5. Said hollow device 3 is provided with an opening extending longitudinally theretrough. A second hollow device 45, which is provided with a leading portion 45A and a trailing portion 45B, is being urged by a foam pig 4 towards an wider end of the first device 3, the foam pig being urged by a fluid flow A—A flowing in the undersea flow pipe 1.

As can be seen in FIG. 1, the trailing portion 45B is hollow and due to the pressure of the fluid flow A—A the foam pig 4 is set in the trailing portion 45B.

Figure 2:
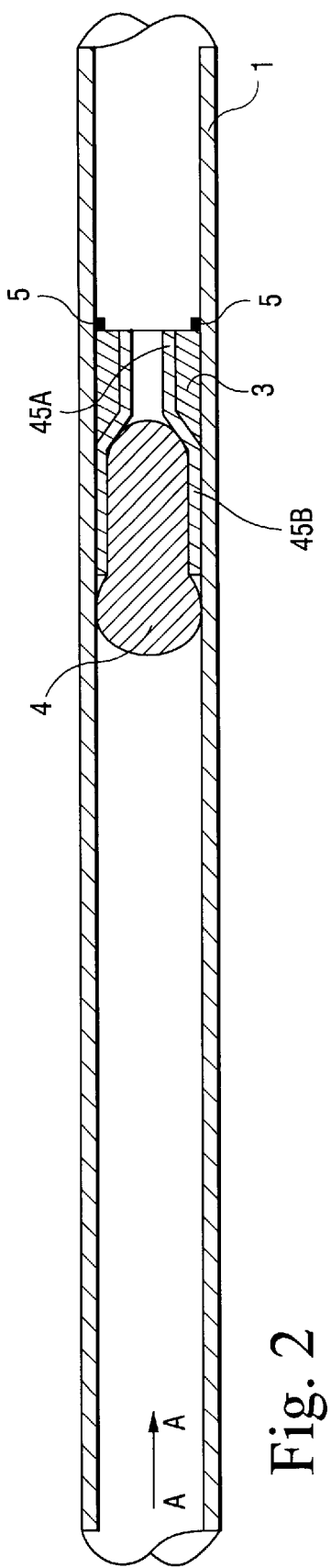
FIG. 2 is a longitudinal cross section view depicting the second hollow device being set into the first hollow device.

In FIG. 2 the second hollow device 45 has already reached and entered the first hollow device 3. As can be seen in the FIG. 2, the hollow cylindrical trailing portion 45B of the second hollow device 45 is provided with such an external diameter that it can be sealingly set into the undersea flow pipe 1, and the leading portion 45A, in this case also cylindrical, is provided with a diameter which is smaller than the external diameter of the trailing portion 45B. The external diameter of the leading portion 45A of the second hollow device 45 is such that it can engage in the opening of the first hollow device 3. Notice that the trailing portion 45B is provided with a passage extending longitudinally theretrough, the diameter of said passage being smaller of the opening of the first hollow device 3.

When the second hollow device 45 reaches the first hollow device 3 the leading portion 45A starts to be longitudinally inserted into the opening of the first hollow device 3, and it will be housed there after the trailing portion 45B of the second hollow device 45, of a larger external diameter, has abutted the first hollow device 3. Preferably, the longitudinal length of the trailing portion 45B of the second hollow device 45 may be substantially equal to the longitudinal length of the first hollow device 3.

Figure 3:
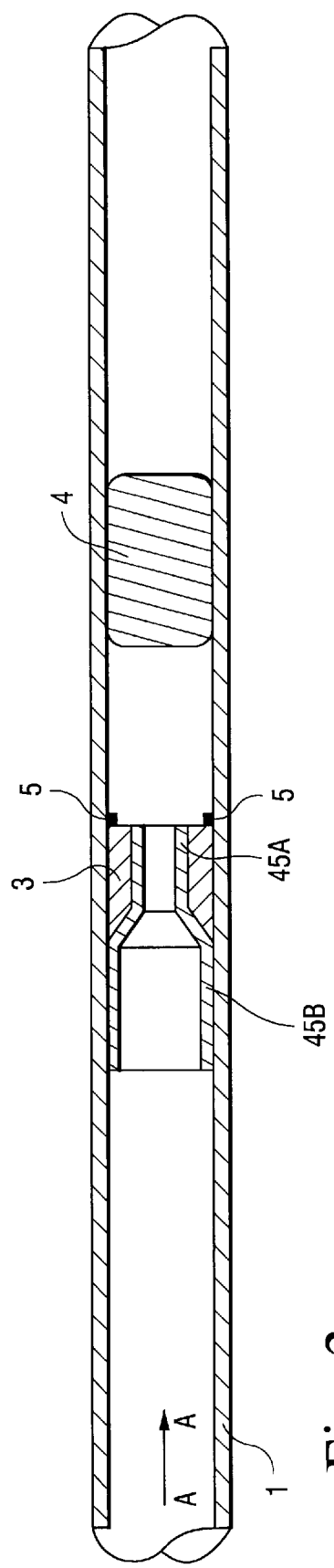
FIG. 3 is a longitudinal cross section view depicting the foam pig just after having passed through the second hollow device, after the latter has been set into the first hollow device.

The foam pig 4 will then pass throughout the opening of the second hollow device 45 and will go on traveling in the undersea pipe flow 1, as shown in FIG. 3, in order to be retrieved by means of any retrieval device well known in the art. However, it is not necessary that the foam pig 4 keep its physical integrity after passing through the opening of the second hollow device 45; it can be destroyed when passing through the opening.

The above described method enables the cross section of the opening of a first hollow device to be diminished without the need to replace such first hollow device by a second hollow device having a passage of smaller internal diameter than the opening of the first hollow device, and only a single flexible pig is used to carry out the whole diminution operation.

While a foam pig has been proposed here to be used for setting a hollow device into its operating position, any other kind of pig, or even any other suitable means, can be used, providing that it is able to pass throughout the opening of the hollow device after the latter has been set.

It must be mentioned here that although the present invention has been described with respect to a hollow device located in an undersea flow pipe, this is only a particular situation, as the present method may be used in any situation where there is a need to diminish the size of the cross section of the opening of a hollow device located in a pipe, be it at an undersea environment or not.

Those skilled in the art will immediately notice that modifications can be introduced in the method disclosed herewith without departing from the scope and the spirit of the present invention.

Having described the present invention with respect to its preferred embodiment, it should be mentioned that the above description should not be taken as limiting the present invention, which is limited only by the scope of the appendant claims.

What is claimed is:

1. A method of diminishing a cross section of an opening of a first hollow device previously set into a flow pipe, through which a fluid flow flows, said method comprising the steps of:

first inserting a second hollow device at an end of said flow pipe located upstream of a point where said first hollow device operates, said second hollow device being provided with a leading portion and a trailing portion, said leading portion being of a smaller external diameter than said trailing portion, said leading portion being able to be sealingly inserted into said opening of said first hollow device, said trailing portion being able to be sealingly set into said flow pipe;

next inserting a driving means immediately after said second hollow device;

allowing said driving means to be urged by said fluid flow flowing in said flow pipe, thereby allowing a displacement of said second hollow device along said flow pipe towards said first hollow device;

when said second hollow device encounters said first device, allowing said leading portion of said second hollow device to be progressively longitudinally inserted into said opening of said first hollow device, until said trailing portion of said second device contacts said first hollow device, thereby stopping said displacement of said second hollow device, whereby said leading portion of said second hollow device will be fully inserted into said opening of said first hollow device; and allowing said driving means to pass through a passage in said second hollow device, urged by a pressure exerted by said fluid flow flowing in said flow pipe, said passage being of a smaller internal diameter of said opening of said first hollow device.

2. A method according to claim 1, wherein said flow pipe is an undersea flow pipe.

3. A method according to claim 2, wherein said driving means is a flexible pig.

4. A method according to claim 3, wherein said flexible pig is a foam pig.

5. A method according to claim 1, wherein a longitudinal length of said leading portion of said second hollow device is substantially equal to a longitudinal length of said first hollow device.

6. A method according to claim 5, wherein said flow pipe is an undersea flow pipe.

7. A method according to claim 6, wherein said driving means is a flexible pig.

8. A method according to claim 7 wherein said flexible pig is a foam pig.

\* \* \* \* \*